Figure 1:
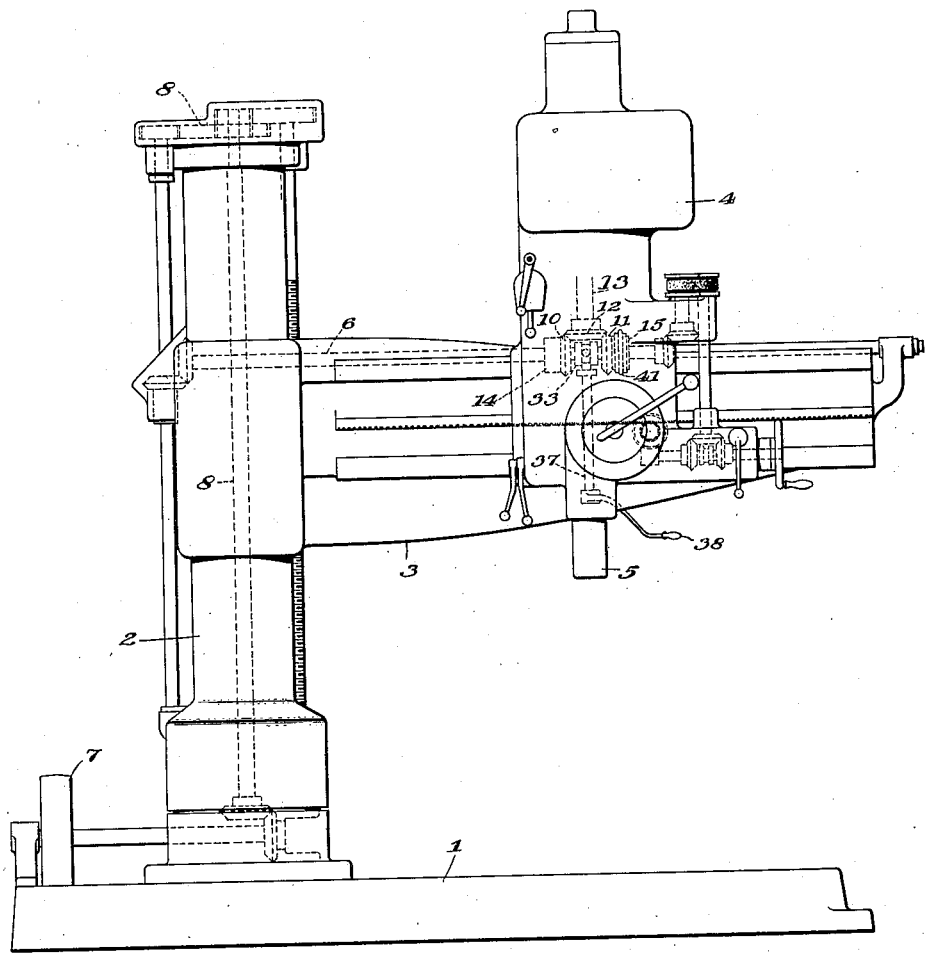

June 28, 1927.

D. C. KLAUSMEYER 1,634,149

BRAKE MECHANISM FOR DRILL SPINDLES

Filed March 21, 1925    3 Sheets-Sheet 1

Inventor
David C. Klausmeyer
By Attorney
Albert F. Nathan

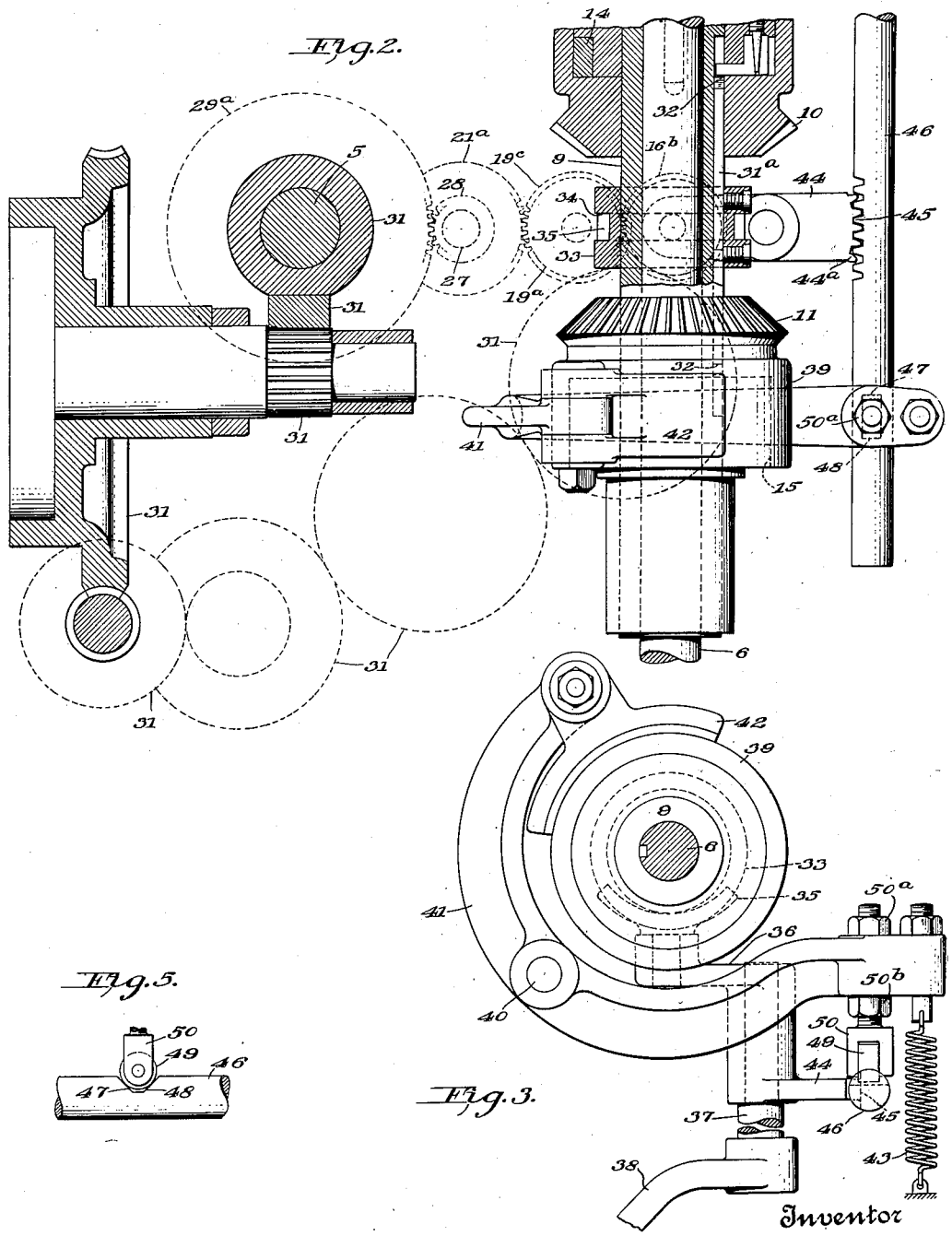

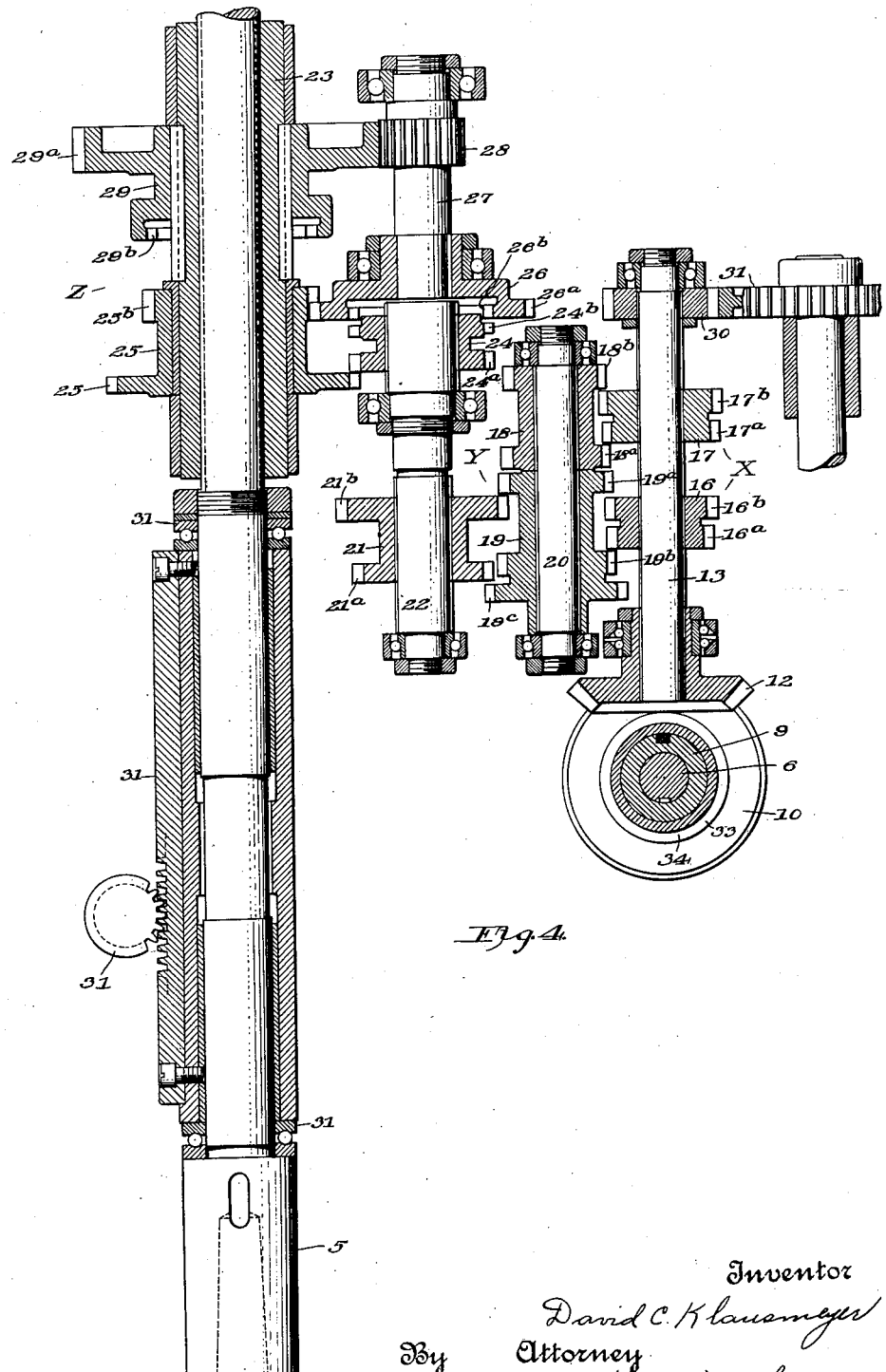

Patented June 28, 1927.

1,634,149

UNITED STATES PATENT OFFICE.

DAVID C. KLAUSMEYER, OF CINCINNATI, OHIO, ASSIGNOR TO THE CINCINNATI BICKFORD TOOL COMPANY, OF OAKLEY, CINCINNATI, OHIO, A CORPORATION OF OHIO.

BRAKE MECHANISM FOR DRILL SPINDLES.

Application filed March 21, 1925. Serial No. 17,306.

This invention relates to radial drilling and tapping machines and it deals more particularly with means for rotating the tool spindle in reverse directions and to means for overcoming the momentum of the parts when the spindle driving and reversing clutches are shifted to their neutral positions.

Radial drilling and tapping machines, as commonly constructed, include a column, an arm extending horizontally from the column and a drill head supported on the arm. Within the drill head is rotatably journaled a tool spindle which receives its rotary movements from a shaft journaled lengthwise of the arm and actuated from any suitable source of power, such, for example, as a motor mounted on the arm or at the base of the column.

When these machine tools are used for tapping it is necessary that the spindle be rotated first in one direction to cause the tap to enter the work and then when the tap has entered the required distance, that the direction of rotation of the tap be reversed to unscrew the tap from the tapped hole. This is usually effected by means of a reversing mechanism comprising two bevel gears loosely carried by the drill head and journaled co-axially with the arm shaft and a single bevel gear connected to rotate the spindle and having its opposite sides in mesh with the two bevel gears. Either of the two bevel gears selectively may be locked to the arm shaft thereby to act as a driver for the single gear, and inasmuch as the two driving gears mesh with opposite sides of the driven gear, it will readily be perceived that they will rotate the driven gear in opposite directions.

Various means have been employed to secure the driving gears to the arm shaft but it has been found that best results are obtained by the employment of friction clutches which permit of a limited lost motion or slippage when the direction of rotation of the spindle is reversed, thereby minimizing the shock and wear on the mechanism. While these friction clutches are designed to permit a limited slippage upon their sudden engagement they must nevertheless be so accurately made and adjusted that they will immediately thereafter be sufficiently positive in their action to transmit heavy loads. Considerable difficulty has heretofore been experienced with these reversing mechanisms due to the fact that the constant slippage causes wear of the parts and therefore they require frequent adjustment and repair to keep them in condition to function properly. Also in the operation of these machine tools it is frequently necessary to bring the tool spindle to rest without reversing its direction of rotation. This has heretofore been accomplished by merely interrupting the power transmission as by shifting the driving clutches to neutral and permitting the parts gradually to slow down and come to rest when their momentum has been expended.

This invention has for an object to provide a brake mechanism for the tool spindle, which will become active immediately upon the discontinuance of the power drive to quickly arrest the rotation of the spindle.

Another object of the invention is to provide a brake mechanism for the tool spindle, and so to coordinate it with the spindle driving mechanism that it will serve to relieve the friction clutches of the sudden strains imposed upon them when the direction of rotation of the spindle is reversed thereby reducing the lost motion and greatly increasing the life of the reversing mechanism.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a side elevation of a radial drill embodying the present invention. Fig. 2 is a detail plan of the reversing mechanism showing the brake mechanism applied thereto. Fig. 3 is an end view of Fig. 2. Fig. 4 is a sectional development of the gear mechanism for selectively rotating the spindle from the arm shaft. Fig. 5 is a detail view showing certain brake actuating cams later to be referred to.

Referring more particularly to the drawings, the invention is disclosed as embodited in a radial drill comprising a base 1 upon which is supported an upright column 2 adapted to carry the usual radial arm 3. A drill-head 4 is adjustably supported upon the radial arm and has rotatably journaled within it a tool spindle 5 adapted to carry the tools commonly used with this type of machine. Rotatably journaled lengthwise of the arm 3 is a shaft 6 (hereinafter called the power shaft) which furnishes power to rotate the tool-spindle as later will be described. Power to rotate the shaft 6 may be provided by any suitable prime-mover 7 which may be located on the base 1 at the foot of the column or elsewhere and operatively connected with the shaft as by suitable power transmission designated generally as 8. In the drawings the prime-mover is shown as comprising a driving pulley but obviously any other prime-mover (such as a motor) may be employed.

Within the drill-head is rotatably journaled a sleeve 9 having a splined connection with the power shaft 6. Thus it will be seen that the sleeve 9 will be rotated continuously while permitting adjustment of the drill head lengthwise of the radial arm 3. Loosely journaled upon the sleeve 9 are bevel gears 10 and 11 maintained permanently in mesh with the opposite sides of a similar gear 12 fixed upon a shaft 13 journaled within the head 4. Clutches 14 and 15 (preferably of the friction type) located within the hubs of the gears 10 and 11 respectively, serve at certain times to lock the gears to the sleeve 9 whereby the locked gear is rotated with the power shaft and transmits motion to the gear 12. It will readily be perceived that inasmuch as the gears 10 and 11 mesh with diametrically opposite sides of the gear 12 they will transmit motion to that gear in opposite directions.

The motion received by the gear 12 is transmitted to the spindle 5 through suitable speed change gears which provide means for varying the speed of rotation of the spindle. Thus by manipulation of suitable levers the gears may be so meshed as to produce the speed best suited to the tool being used and to the work being operated on. As shown in Fig. 4 these speed changes may be effected by three separate change gear sets X, Y and Z. The gear set X comprises gear units 16 and 17 splined upon the shaft 13 and providing gears $16^a$, $16^b$ and $17^a$ and $17^b$ respectively. These gears are adapted selectively to be meshed with gears $18^a$, $18^b$ and $19^a$, $19^b$ provided by gear-units 18 and 19 fixed to a shaft 20 also journaled within the drill-head. Thus by selectively meshing these gears four speeds may be transmitted to the shaft 20 from a single speed in the shaft 13.

The gear-unit 19 also provides a gear $19^c$ which is adapted to be meshed with a gear $21^a$ provided by a gear-unit 21 splined to a shaft 22 journaled in the drill-head parallel to the shaft 20. A gear $21^b$ which is adapted to be meshed with the gear $19^a$ is also provided by the gear-unit 21. The gears $19^a$, $19^c$, $21^a$ and $21^b$ constitute the change gear set Y which serves to double the four speeds produced in the gear set X.

The tool spindle 5 is translatably but nonrotatably journaled in a sleeve 23 journaled in the drill-head 4. Rotation is transmitted from the shaft 22 to the sleeve 23 and thence to the spindle by means of the gear set Z usually known as the back-gears which provide four speeds thereby multiplying the eight speeds in the shaft 22 into thirty-two speeds in the spindle. This gear set comprises a gear unit 24 splined to the shaft 22 and providing a gear $24^a$ and a clutch member $24^b$. Rotatably journaled on the sleeve 23 is a gear unit 25 providing a gear $25^a$ with which the gear $24^a$ is adapted to be meshed, and a gear $25^b$ permanently in mesh with a gear $26^a$ provided by a gear-unit 26 secured upon a shaft 27 journaled in line with the shaft 22. The gear-unit 26 also provides a clutch member $26^b$ adapted to be engaged by the clutch member $24^b$. The shaft 27 also has secured to it a small gear 28. Splined to the sleeve 23 is a gear-unit 29 providing a gear $29^a$ adapted to mesh with the gear 28 and a clutch-member $29^b$ adapted to engage the gear $25^b$. From the foregoing it will be seen that the gear-unit 25 may be rotated either by the gear $24^a$ or by the gear $26^a$ through the clutch $24^b$—$26^b$. By shifting the clutch member $29^b$ into engagement with the gear $25^b$ these two speeds are transmitted to the sleeve 23 and thereby to the spindle. The gear-unit 26, and thereby the shaft 27 and gear 28, also receives two speeds for each speed in the shaft 22. One of these speeds is obtained through engagement of the clutch members $24^b$ and $26^b$ and the other is obtained through gears $24^a$, $25^a$, $25^b$ and $26^a$. Thus by selectively meshing the gears and clutches any one of thirty-two speeds may be produced in the spindle from a single speed in the power shaft. The shaft 13 also carries a spindle-translating actuating gear 30 which through a suitable drive designated generally as 31 effects endwise movement of the spindle.

While this invention is described in connection with a radial drill in which all of the speed change gears are embodied in the drill-head it is to be understood that it is likewise adaptable to those drills in which the drill-head carries only the back-gears and the speed changes corresponding to those obtained in gear sets X and Y are obtained elsewhere.

The clutches 14 and 15 may be of any suitable construction, such for example as that shown in the reissue patent to Norris, No.

14,755 dated November 18, 1919, and, as shown in that patent, the clutches may be actuated by a bar 31ª slidably mounted in a groove formed in the sleeve 9 and provided with clutch actuating cams 32. Inasmuch as the specific construction of the clutches forms no part of the present invention, detailed illustration and description thereof is deemed unnecessary. A collar 33 slidably mounted on the sleeve 9, is attached to the slide bar and this collar is adapted to be shifted in opposite directions lengthwise of the sleeve selectively to actuate the clutches 14 and 15. The collar is preferably formed with an annular groove 34 which is engaged by a yoke 35 carried by an arm 36 secured upon the upper end of a rod 37 journaled vertically in the drill head 4. A lever 38 fixed to the lower end of the rod affords means to oscillate the rod, selectively to actuate the clutches.

Considering now that the lever 38 has been actuated to connect one of the clutches with the sleeve 9 and that power is being transmitted to rotate the spindle, it will be understood that all of the mechanism shown in Fig. 4 will be rotating. Now if the lever 38 is shifted to its intermediate position the active clutch will be disconnected and power will no longer be transmitted to the spindle. However, due to the momentum of the parts they will continue to rotate with the result that the spindle will be rotated even after the power has been disconnected. It will also be seen that if the tool is being used for tapping and the lever 38 is shifted from its position wherein it connects the spindle forward drive clutch to the position wherein it connects the spindle reverse drive clutch to stop the forward rotation of the tap and withdraw it from the tapped hole before the reversing clutch can function it must first overcome the momentum of the forwardly rotating parts. This action causes considerable wear on the parts of the clutch and necessitates frequent adjustment and repair thereof.

As hereinbefore stated this invention provides means, independent of the clutches, to overcome the momentum of the spindle and its actuating mechanism, when the lever 38 is shifted to its intermediate position. This mechanism comprises a friction brake which is controlled by the clutch actuating lever and which acts upon the spindle rotating means instantaneously with the disconnection of either clutch. Thus it will be seen that the instant the lever 38 is shifted from one of its operative positions to its neutral position whether that movement be for the purpose of bringing the spindle to rest or merely as a preliminary movement in effecting a reversal of the spindle, the brake becomes effective and overcomes the momentum of the spindle and its actuating mechanism, thereby relieving the clutches of the strains and lost motion to which they have heretofore been subjected and which have caused wear and tear on the parts.

This brake mechanism comprises a brake drum carried by one of the rotating parts of the spindle driving mechanism and preferably by one of the gears 10 or 11 or the friction clutches carried thereby. The drum may be a separate element or as shown at 39 in Figs. 2 and 3 it may consist of the cylindrical casing of one of the clutches. Fulcrumed at 40 within the drill-head is a brake-lever 41 having pivoted to it, at one end, a brake-shoe 42 adapted to bear upon the brake drum 39. To the opposite end of the lever 41 is connected one end of a spring 43 having its other end secured to a fixed part of the drill head. This spring constantly exerts power on the lever 41 and tends to swing it about the pivot 40 in a direction to force the brake shoe against the brake drum. The rod 37 also has secured to it an arm 44 provided with a gear-segment 44ª permanently in mesh with the teeth 45 of a rack-bar 46 slidably mounted in the drill head. This rack-bar is formed with cam portions 47 and 48 between which (in the neutral position of the parts) rests a roller 49 carried by a yoke 50 adjustably carried by the lever 41. Nuts 50ª and 50ᵇ serve to shift the yoke lengthwise in the lever and to hold it in any desired position of adjustment.

The operation of the brake mechanism is as follows: Presupposing that the power shaft 6 is rotating, that the collar is in its intermediate position, that both of the clutches 14 and 15 are released and the spindle driving mechanism is at rest, movement of the lever 38 to the left as viewed in Fig. 1 will rotate the rod 37 and the arm 36 clockwise as viewed in plan (Fig. 2) thereby causing the collar 33 and the clutch-actuating bar 31 to be moved toward the clutch 14 which causes the gear 10 to be secured to the sleeve 9 thereby to start rotation of the spindle driving train of gears. As the arm 36 moves the collar 33 toward the clutch 14 the arm 44 through the gear-segment 44ª and rack-teeth 45, moves the bar 46 in the opposite direction and the cam 47 acts upon the roller 49 and causes the lever 41 to be rocked anti-clockwise as viewed in Fig. 3 against the action of the spring 43 thereby lifting the brakeshoe 42 from the brake drum and permitting the loosely journaled gear 11 to turn with the gear 12 to which power is now being applied by the gear 10. The cam 48 acts upon the brake lever in a similar manner when the lever 38 is moved in the opposite direction to actuate the clutch 15. When the rod 37 is rotated to move the collar to its intermediate or neutral position the parts act in the reverse order and roller 44 descends the cam 47 or 48, dependent upon which clutch was last engaged, thereby permitting the spring 43 to swing the lever 41 about its pivot to apply the brake-shoe to the brake-drum. Obviously the parts could be re-arranged so as to cause the spring to act to retract the brake shoe from the brake drum and the cams 47 and 48 could be arranged to force the brake-shoe and brake-drum together against the action of the spring and it is to be understood that this invention contemplates such a re-arrangement.

From the foregoing it will be perceived that this invention provides a simple and efficient means for overcoming the momentum of the tool spindle and its actuating mechanism both when it is desired to bring the parts to rest and also when it is desired to reverse their direction of rotation, thereby greatly reducing the wear on the friction clutches. It is to be noted that the yoke 50 may readily be adjusted in the lever to compensate for wear on the brake shoe.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a radial drill, a prime-mover; a spindle; a driving connection between the prime-mover and the spindle; means to disconnect the spindle from the prime-mover; and means to arrest the rotation of said spindle when it is disconnected from said prime-mover.

2. In a radial drill, a prime-mover; a spindle; power transmission between said prime-mover and said spindle to rotate the latter from the former; means to discontinue the transmission of power to said spindle; and a brake mechanism acting upon said power transmission to arrest the rotation of said spindle.

3. In a radial drill, a power shaft; a tool spindle; a driving connection between said power shaft and said spindle including a clutch; means to render said clutch ineffective to transmit power; and a brake mechanism adapted to act upon said driving connection, when said clutch is rendered ineffective, to overcome the momentum of said spindle.

4. In a radial drill, a power shaft; a tool spindle; means actuated by said power shaft to rotate said spindle in reverse directions, said means including two clutches and a driving connection between said clutches and said spindle; means to alternately actuate said clutches to cause them to reverse the direction of rotation of said spindle; and a brake mechanism controlled to be actuated after one of said clutches has been released and before the other has been engaged to apply a braking power on said spindle rotating means.

5. In a radial drill, a power shaft; a tool spindle; means actuated by said power shaft to rotate said spindle in reverse directions, said means including two gears loosely journaled co-axial with said power shaft; a single gear meshing with both of said two gears; a driving connection between said single gear and said spindle; clutch mechanism associated with each of said two gears and adapted selectively to cause said gears to be rotated by said power shaft; means selectively to actuate said clutches; and a brake mechanism actuated by said clutch actuating means and adapted to apply a braking power to said spindle driving means when both of said clutches are in their neutral position.

6. In a radial drill, a power shaft; a tool spindle; means actuated by said power shaft to rotate said spindle, said means including a gear loosely journaled co-axial with said power shaft; a driving connection between said gear and said spindle; a clutch mechanism associated with said gear; means to actuate said clutch to cause it to connect said gear with said power shaft; and a brake mechanism acting upon said gear and actuated by the clutch controlling means to apply a braking power to said gear when the clutch is rendered inoperative to transmit power.

7. In a radial drill, a power shaft; a tool spindle; means actuated by said power shaft to rotate said spindle and means including a gear loosely journaled co-axial with said power shaft; a driving connection between said gear and said spindle; a clutch mechanism associated with said gear; a brake drum rotatable with said gear; means to actuate said clutch mechanism to cause it to connect said gear with said power shaft; and a braking element adapted, upon the release of said clutch, to forcibly engage said brake drum to arrest the rotation of said gear.

8. In a radial drilling and tapping machine, a power shaft; a spindle; means actuated by the power shaft to rotate said spindle in reverse directions, said means including a bevel gear operatively connected with the spindle; two bevel gears loosely journaled co-axial with said power shaft and engaging the opposite sides of said first named gear; a clutch associated with each of said two gears; a single actuating means for both of said clutches whereby said two gears may alternately be secured to said shaft to rotate said first named gear in reverse direction; and a brake device actuated by said clutch actuating means to arrest the rotation of said spindle rotating means when said clutches are rendered inoperative to transmit power.

9. In a radial drilling and tapping machine; an arm, a drill head mounted on the arm; a power shaft extending lengthwise of said arm; a tool spindle rotatably journaled in the drill-head; means actuated by the power shaft to rotate said spindle, said means including two bevel gears rotatably journaled in said drill head co-axial with said power shaft; a single bevel gear permanently in mesh with said two bevel gears; an operative connection between said single bevel gear and said spindle; a clutch associated with each of said two gears and adapted to secure said gears to the power shaft; a clutch shifting collar; a brake drum; a lever pivoted to said drill head and carrying a brake-shoe adapted to act upon said brake-drum; means to shift said collar selectively to engage said clutches; and means cooperating with said shifting means to rock said lever, thereby to force said brake-shoe against said brake-drum when said clutches are rendered ineffective to transmit power.

10. In a radial drill, a power shaft; a second shaft; a drill spindle; means to rotate said spindle from said power shaft, said means including a gear fixed to one of said shafts and a gear loosely journaled co-axial with the other of said shafts; a clutch for securing said loosely journaled gear to its shaft; means to actuate said clutch, said last named means including an oscillatory member; a brake-drum rotatable with said gear; a pivoted lever; a brake-shoe carried by said lever and adapted to engage said brake-drum; and means actuated by said oscillatory member to swing said lever about its pivot for the purpose set forth.

11. In a radial drill in combination, a power shaft; a drill spindle; means to rotate said spindle from said power shaft, said means including a gear loosely journaled co-axial with said power shaft; a driving connection from said gear to said spindle; a clutch to secure said gear to said power shaft; clutch-actuating means including an oscillatory member; a brake drum rotatable with said gear; a pivoted lever; a brake-shoe carried by said lever; pressure means normally tending to force said brake-shoe into contact with said brake-drum; a movable abutment acting on said lever to prevent it from moving under the action of said pressure means; and means actuated by the movement of said oscillatory member to remove said abutment from said lever to permit a braking power to be applied to said drum.

12. The combination set forth in claim 11 characterized by this, that a spring acts upon the lever to force the brake-shoe into contact with the brake-drum when the clutch is ineffective and a cam, shiftable by the oscillatory member, acts upon the lever in opposition to the spring, when the member is oscillated to render the clutch effective, to withdraw the brake-shoe from the drum.

13. The combination set forth in claim 11, characterized by this, that a spring normally acts upon the lever to force the brake-shoe into contact with the brake drum; and that the oscillatory member carries a gear segment meshing with a rack-bar provided with a cam which engages a roller carried by the lever, whereby shifting of the oscillatory member to its clutch-actuating position causes said cam to engage said roller and to swing the lever to withdraw the brake-shoe from the brake-drum.

14. In a radial drill, a prime-mover; a spindle; a driving connection between the prime-mover and the spindle; means to disconnect the spindle from the prime-mover; and means to impede the rotation of said spindle when it is disconnected from said prime-mover.

In witness whereof, I have hereunto subscribed my name.

DAVID C. KLAUSMEYER.